(12) United States Patent
Wagensommer et al.

(10) Patent No.: US 11,507,329 B2
(45) Date of Patent: Nov. 22, 2022

(54) METHOD FOR IMPROVED PROCESSING OF PRINT JOBS USING COMPATIBLE MATERIAL

(71) Applicant: HEIDELBERGER DRUCKMASCHINEN AG, Heidelberg (DE)

(72) Inventors: Bernhard Wagensommer, Malsch (DE); Rainer Wolf, Stuttgart (DE); Frank Kropp, Mauer (DE); Gottfried Grasl, Angelbachtal (DE); Dominic Stahl, Mauer (DE); Georg Roessler, Angelbachtal (DE); Juergen Grimm, Frankfurt (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 17/160,439

(22) Filed: Jan. 28, 2021

(65) Prior Publication Data
US 2021/0232351 A1  Jul. 29, 2021

(30) Foreign Application Priority Data

Jan. 29, 2020 (EP) .................................. 20154254

(51) Int. Cl.
*G06F 3/12* (2006.01)
(52) U.S. Cl.
CPC .......... *G06F 3/1208* (2013.01); *G06F 3/1256* (2013.01); *G06F 3/1204* (2013.01)

(58) Field of Classification Search
CPC ................. G06F 3/1208; G06F 3/1256; G06F 2206/1504; G06F 3/1255; G06F 3/1285;
(Continued)

(56) References Cited

U.S. PATENT DOCUMENTS 6,567,533 B1 * 5/2003 Rhoads .............. H04N 1/00037
704/E19.009
7,454,263 B2   11/2008 Hauck
(Continued)

FOREIGN PATENT DOCUMENTS

DE            10003797 A1     8/2001
DE       102004033056 A1     2/2005
(Continued)

*Primary Examiner* — Darryl V Dottin
(74) *Attorney, Agent, or Firm* — Laurence A. Greenberg; Werner H. Stemer; Ralph E. Locher

(57) ABSTRACT

A method of producing printed products uses at least one computer and at least one input device for controlling at least one machine for processing printing substrates. The input device receives technical and economic data of at least one print shop and the computer receives customer preferences relating to print jobs by using the input device. Based on the technical and economic data of the print shop, the computer calculates a simulation of possible print jobs producible in the print shop. The computer takes into account the results of the simulation and the customer preference inputs and generates matching offers for print jobs. The computer compares the generated offers with customer print jobs and, if a match is found between an offer and a customer's print job, the print job is processed by the machine for processing printing substrates.

11 Claims, 1 Drawing Sheet

(58) Field of Classification Search
CPC .... G06F 3/1217; G06F 3/1219; G06F 3/1237; G06F 3/1204; G06Q 10/06395; G06Q 50/04
USPC ........................................................ 358/1.15
See application file for complete search history.

(56) References Cited

U.S. PATENT DOCUMENTS

| | | | |
|---|---|---|---|
| 2007/0095494 | A1 | 5/2007 | Pihola et al. |
| 2008/0065455 | A1 | 2/2008 | Sun et al. |
| 2011/0258137 | A1* | 10/2011 | Pasta ................. G06Q 30/02 705/347 |
| 2014/0195921 | A1* | 7/2014 | Grosz ................. G06F 3/126 715/738 |
| 2017/0277778 | A1* | 9/2017 | Cherukuri .......... G06Q 30/0256 |

FOREIGN PATENT DOCUMENTS

| | | |
|---|---|---|
| DE | 102007032944 B4 | 10/2011 |
| EP | 2026192 A2 | 2/2009 |
| JP | 2007320134 A | 12/2007 |

* cited by examiner

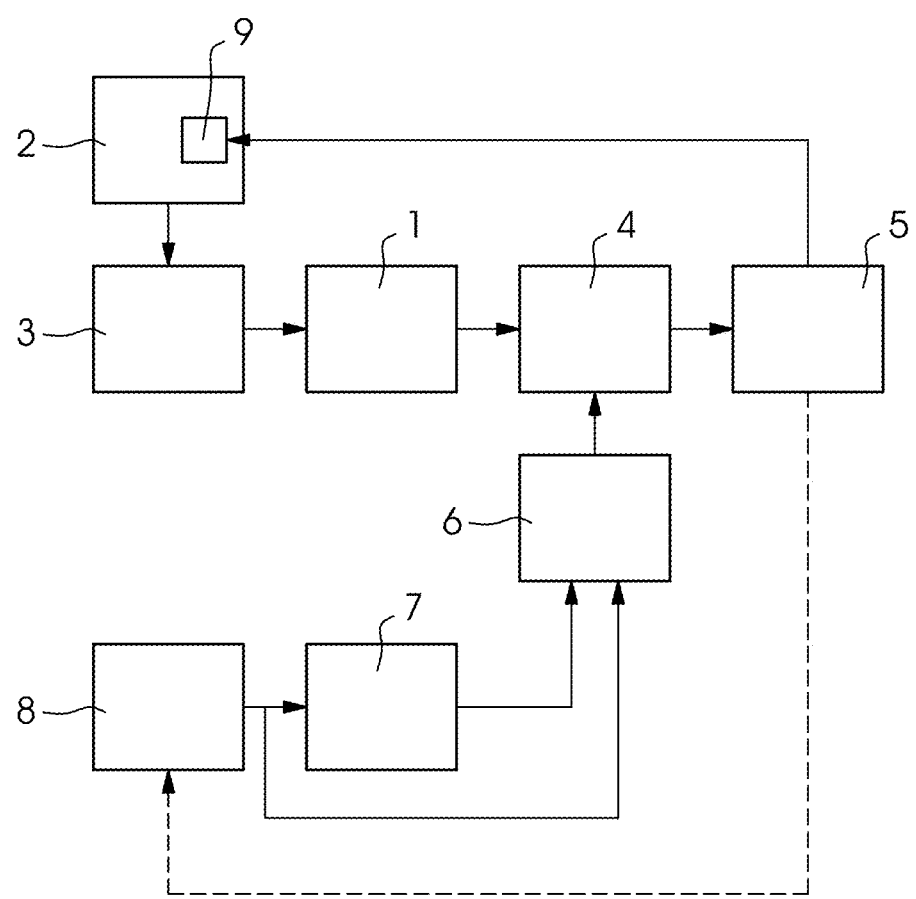

METHOD FOR IMPROVED PROCESSING OF PRINT JOBS USING COMPATIBLE MATERIAL

CROSS-REFERENCE TO RELATED APPLICATION

This application claims the priority, under 35 U.S.C. § 119, of European Patent Application EP 20154254, filed Jan. 29, 2020; the prior application is herewith incorporated by reference in its entirety.

BACKGROUND OF THE INVENTION

Field of the Invention

The present invention relates to a method for producing printed products by using at least one computer and at least one input device for controlling at least one machine for processing printing substrates, the method including the steps of supplying the at least one input device with technical and economic data of at least one print shop and supplying the at least one computer with customer preferences relating to print jobs by using the at least one input device.

Methods of optimizing the manufacturing processes of printed products are known in the art. Such a method is disclosed in German Patent DE 10 2007 032 944 B4, which describes establishing parameters of a printing machine for standardized printing. With the aid of a computer, an operator may select process colors, spot colors, and printing substrates from a database to generate a profile. Furthermore, the operator may indicate measurement conditions for quality control operations on the printing substrate or tolerances which the printed product must not exceed. Based on the input data and data from the database, the computer subsequently calculates a recommendation for setting the parameters of the printing machine. The parameters may be set by the operator and the print job may then be processed on the printing machine.

U.S. Patent Application Publication No. 2007/0095494 A1 discloses a method for simplifying an optimization of the manufacturing process of paper for printing operations relating to the required quality or the operating parameters. In the manufacturing process, fiber-based web-like products are created, and to optimize the operation, quality factors are defined for the manufactured product, control variables that affect the process or the quality factors are determined, and the effect of every control variable on the quality factors are depicted. A user interface simultaneously displays the varying values of the control variables or the values of the quality factors so that the operator of the manufacturing process may see the values of the control variables and the values of the quality factors at the same time.

Published German Patent Application DE 100 03 797 A1 discloses a method of choosing printing substrates and printing ink in multicolor printing machines. Before taking a proof from a multicolor printing machine, the types of printing substrates and the printing properties thereof are stored on a computer and displayed on a monitor connected to the computer. Furthermore the image to be printed and various printing processes and printing inks and the properties thereof are digitally input and displayed on the monitor. An input keyboard connected to the computer and the monitor allows the type of printing substrate and the printing process to be selected on the monitor to display a simulated proof. In this way, an operator of the printing machine may monitor the effect of a selected printing process on a screen.

A disadvantage of the aforementioned prior art is that no output of a quality value that may be attained for the future printed product as a function of the quality of the ink and the printing process is provided. Neither does the prior art include storing parameters of a printing machine for standardized prints using tolerances as a function of available materials or printing processes.

BRIEF SUMMARY OF THE INVENTION

It is accordingly an object of the invention to provide a method for improved processing of print jobs using compatible material, which overcomes the hereinafore-mentioned disadvantages of the heretofore-known methods of this general type, which creates a simulation of the print quality that may be attained as a function of paper quality, ink quality, printing process, and machine configuration/manufacturing process and which in the end allows the print jobs sent to a print shop by a customer to be manufactured at a desired print quality.

With the foregoing and other objects in view there is provided, in accordance with the invention, a method of producing printed products, which comprises providing at least one computer and at least one input device for controlling at least one machine for processing printing substrates, the at least one input device receives technical and economic data of at least one print shop and the at least one computer receives customer preferences relating to print jobs by using the at least one input device, based on the technical and economic data of the at least one print shop, the at least one computer calculates a simulation of possible print jobs producible in the at least one print shop, the at least one computer takes into consideration the results of the simulation and the customer preference inputs and generates matching offers for print jobs, the at least one computer compares the generated offers with customer print jobs and, if a match is found between an offer and a customer's print job, the print job is processed by the at least one machine for processing printing substrates.

In accordance with the invention, at least one computer uses the technical and economic data of at least one print shop to calculate a simulation of potential print jobs that are producible in the at least one print shop. In this process, it is possible either to calculate all possible print jobs or to use customer specifications on the customers' preferences that they initially provide, thus limiting the jobs to ensure that only suitable print jobs are calculated because it does not make sense to calculate print jobs that are not in demand although they may technically be processed in a print shop. In this way, initially those printed products are calculated that can actually be produced in a print shop when the available machinery, consumables used in the print shop, and economic constraints are taken into consideration. Then the computer uses the results of the simulation and the preferences customers have input to prepare suitable print job offers. In this step, the technical and economic capabilities of a print shop are matched with a customer's preferences; but as indicated above, customer preferences may already be taken into account when the possible print jobs are being calculated. These customer preferences may be input by the customers themselves, but the system may also be self-learning in that it continuously analyzes customers' print jobs and records a customer's preferences relating to the inks, printing substrates, etc. to be used. The computer then compares the generated offers with actual customers' print jobs and, if there is a match between an offer and a customer's print job, forwards the print job to a printing machine available in the print shop for processing.

The method of the invention thus allows customers' print jobs to be processed in a customized way based on the possibilities a print shop has and taking into consideration customer preferences. Thus, it is possible to match manufacturing resources and customer demands in a fully automated way. Customers may in particular input their preferences on computers connected to the Internet, and the technical and economic data of the print shop may likewise be input on a computer connected to the internet. The Internet in turn connects both computers that are connected to the Internet to a computer of a platform that matches customer preferences with technical and economic data of the respective print shop. This is where the calculation of the matches is made and the matching print jobs are forwarded to the print shop.

A first embodiment of the invention envisages that the customer uses an input device to specify tolerances that are applied to the customer preferences and the results provided by the computer and are taken into account when the computer generates the offers. Since there is an almost infinite variety of printing substrates, in particular in terms of weight and coating, and of printing inks, it is difficult to find 100% matches between print jobs and print shop resources. The present embodiment of the invention now allows a customer to input tolerances, for instance in terms of printing substrate weights, coatings, or printing inks, to accept specific deviations in a range of a maximum of 5%, for instance. This is a way to increase the chances of a match between customers' print job demands and the manufacturing resources of a print shop. In this way, the circle of possible print shops may be extended, usually resulting in lower job costs and providing more cost-efficient printing services to customers.

A further embodiment of the present invention envisages that the technical or economic data inputs of the print shop include characteristics such as printing substrate, ink, processes possible in a print shop, and costs. These technical and economic data provide an adequate representation of the capabilities and performance of a print shop for appropriate print job allocation. In order to provide successful matching of print jobs and the product ranges of print shops, it is important to take into account both technical and economic data, since it is not enough for a print shop to be capable of processing a print job in a technical respect if it means a high financial risk for the print shop. Therefore, economic data of a print shop likewise need to be provided to be able to eliminate print jobs that would not make sense for a print shop in economic terms. Charging customers high prices can be avoided if the customers lower their demands in the customer preferences, causing print shop costs to drop and allowing print shops to produce in an economically viable way despite lower prices.

A further embodiment of the method of the present invention envisages that the print shop inputs product descriptions for specific printed products, providing characteristics such as printing substrate format, ink requirements, product characteristics, and the image content to be printed. In such a case, the print shop may provide accurate descriptions of specific printed products that it prefers to manufacture. In this way, the print shop may offer only specific products that bring in sufficient profits.

In accordance with an advantageous further feature, the customer preferences which a customer may input may include the desired print quality. Inputting print quality may considerably widen a customer's choice because the higher the desired print quality, the fewer print shops will be capable of providing a specific printed product of the desired quality. In addition, the higher the print quality, the higher the printing costs. Thus, all customers may themselves reduce or increase the number of print shops capable of completing a print job by defining the desired quality of the product.

A further development of the present invention envisages that the desired print quality is defined by at least one of a list including inputs such as visual comparison, media type, print sample catalog, printing standard, quality scale, or customer reviews. A desired print quality may be defined by different criteria. A simple option is a visual comparison, i.e. the customer and the print shop owner visually inspect the product to decide whether the desired print quality has been attained. In such a case, the print quality may be subject to greater fluctuation since the human eye does not realize all deviations. It is likewise possible to define a media type such as a glossy brochure with all quality requirements inherent in this field. It is likewise possible to select a print sample catalog or to use a specific printing standard such as an ISO standard. In addition, it is possible to work with a quality scale or customer reviews. Of course, it is possible to combine a number of quality criteria with one another. A quality scale may include several quality levels, for instance, in particular from 1 to 5. In this context, quality level 1 indicates low quality and quality level 5 indicates high quality. Thus, the number of potential print shops increases or decreases and the costs of the job change in a corresponding way. Customer reviews may likewise be represented on a multi-level scale indicating customer satisfaction, for instance likewise by 5 levels. This may be done by awarding stars, for instance, with a low level of satisfaction indicated by a single star and a high level of satisfaction indicated by five stars. These days, such customer reviews are commonly used for services provided over the internet, for instance in online retailing, where customers review products they bought and the performance of the retailer. Such a satisfaction review may also be provided for the quality of a printed product. For instance, customer preferences may specify that only print shops that have received at least 4 stars in customer reviews may be selected because a customer considers this as a sufficient hallmark of quality.

A further embodiment of the method of the invention envisages that the preferences of the customer characteristics of the print shop include timeliness, costs, and quality of the binding of a printed product. When a customer defines such preferences, they likewise specify a certain quality level right from the start, which means that only print shops that meet these requirements may be selected to process the print job. In this context, too, the customer may place a different focus by inputting different demands on timeliness, costs, and quality of the binding of a printed product.

The input devices are preferably connected to the at least one computer and the at least one machine for processing printing substrates by defined standardized software interfaces. In this context, the computers at the customer's location, at the print shop, and, if applicable, of the internet platform are equipped with standardized software interfaces that allow the data provided by the print shop and the customers to be analyzed in a consistent and reproducible way and the print job to be processed by the machine for processing printing substrates in the desired way. A standardized software interface in particular ensures that all data are transmitted in the correct format and the required formats of the computers and substrate-processing machinery involved in the process are converted if data formats deviate. This is of particular importance due to the high number of different customers and print shops because many customers and print shops work with dedicated data types that need to be harmonized for any meaningful processing. One standardization option is to use specific forms that request data in a specific format when customers or print shops make data inputs on the computer. This ensures that customers and print shops provide the data to be processed in a format that may be correctly and reproducibly processed in accordance with the method of the invention.

Other features which are considered as characteristic for the invention are set forth in the appended claims.

Although the invention is illustrated and described herein as embodied in a method for improved processing of print jobs using compatible material, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the Drawing is a Block Diagram of a System Including at Least one print shop, a customer's computer and a computer for implementing the method of the invention.

DETAILED DESCRIPTION OF THE INVENTION

Referring now in detail to the single FIGURE of the drawing, there is seen a simplified system for implementing the method of the invention. For reasons of simplicity, only one print shop 2, one printing machine 9, and one customer 8 are shown. It is to be understood, however, that the system may extend to any number of printing machines 9 in any number of print shops 2 and to any number of customers 8. The FIGURE shows the print shop 2 with the one printing machine 9 having specific technical characteristics. A print shop owner may input the technical characteristics of the print shop using an input device 3 in the print shop 2. In addition, the print shop owner may input the characteristics of the consumables such as the paper or ink that are used. The owner of the print shop 2 may likewise input the cost structure using the input device 3. The input device 3 is preferably a computer connected to the Internet. In addition, the FIGURE illustrates a simulation computer 1 communicating with the input device 3 of the print shop 2, preferably likewise over the Internet. In this way, the data from the print shop 2 may be transported to the simulation computer 1. In addition, potential customers 8 of the print shop 2 may input customer preferences 7 and print jobs using a similar input device. This is preferably likewise done by using a computer that is connected to the Internet. The input customer preferences 7 may furthermore be made more or less strict by inputting tolerances 6. These inputs may be made on the same computer that the customer used to input the customer preferences 7 or the print jobs. The customer preferences and tolerances are then forwarded to a variant computer 4 that processes the customer preferences 7 and tolerances 6 and matches them with the results of the simulation of the simulation computer 1.

On the basis of the print shop 2, the simulation computer 1 generates all print jobs that are technically and economically possible. The latter now need to be matched with print jobs of a customer 8 by using the variant computer 4. For, in the end, it is all about processing print jobs of a customer 8, since literally customers 8 do not really want to go by the technical and economic capabilities of a print shop 2. Applying the input tolerances 6 and customer preferences 7 as well as the print job defined by the customer 8, the variant computer 4 then generates corresponding variants, which are then compared to the simulation results of the simulation computer 1. If a match is found, an output module 5 may send corresponding offers back to the customer 8. The output module 5 and the variant computer 4 are connected to the Internet, where demand may easily be exchanged between all connected computers. The offer may then be sent to the customer 8, who may then finalize the print job order. After finalization by the customer 8, the output module 5 forwards the print job directly to the print shop 2, where it is processed by the printing machine 9. This provides a fully automated and economically expedient way of matching demands of a customer 8 with the capabilities of a print shop to allow print jobs to be efficiently processed. The simulation computer 1, the variant computer 4, the input devices 3, 7, and the output module 5 may preferably be part of an online platform for routing print jobs between customers 8 and print shops 2 to match the two with one another in an automated way. Such a platform solution is preferably embodied as a browser application that works on every web-enabled computer. It goes without saying that the simulation computer 1, the variant computer 4, and the output module 5 need not be present as physical devices. Instead, a suitable software and available computation capacity such as an online cloud solution would work just as well.

The following is a summary list of reference numerals and the corresponding structure used in the above description of the invention:

1 simulation computer
2 print shop
3 print shop inputs
4 variant computer
5 offer output
6 tolerance input
7 customer preferences
8 customer
9 printing machine

The invention claimed is:
1. A method of producing printed products, the method comprising:
  providing at least one computer and at least one input device for controlling at least one machine for processing printing substrates;
  using the at least one input device to receive technical and economic data of at least one print shop;
  using the at least one input device to supply the at least one computer with customer preferences relating to print jobs;
  using the at least one computer to calculate a simulation of possible print jobs producible in the at least one print shop based on the technical and economic data of the at least one print shop;

using the at least one computer to generate matching offers for print jobs by taking results of the simulation and the customer preference inputs into account;

using an input device operated by the customer to define tolerances to be applied to the customer preferences and to the simulated results of the computer to be taken into account when the computer calculates the offers;

using the at least one computer to compare the generated offers with customer print jobs; and using the at least one machine for processing printing substrates to process the print job upon finding a match between an offer and a print job of a customer.

2. The method according to claim 1, which further comprises providing characteristics including printing substrate, ink, possible processes in the print shop or costs in the technical or economic print shop data being input.

3. The method according to claim 2, which further comprises inputting product descriptions of specific printed products from the print shop, and providing characteristics including printing substrate, color format, product characteristics, and image content to be printed in the product descriptions.

4. The method according to claim 1, which further comprises including a desired print quality in the customer preference inputs.

5. The method according to claim 4, which further comprises defining the desired print quality by at least one parameter including visual comparison, media type, print sample catalog, printing standard, quality scale or customer reviews.

6. The method according to claim 5, which further comprises dividing the quality scale into multiple quality levels.

7. The method according to claim 5, which further comprises dividing the quality scale into quality levels 1 to 5.

8. The method according to claim 5, which further comprises forming the customer reviews into a multi-level satisfaction scale.

9. The method according to claim 5, which further comprises forming the customer reviews into a 5-level satisfaction scale.

10. The method according to claim 1, which further comprises providing characteristics of the print shop including timeliness, costs or quality of a binding of a printed product in the customer preferences.

11. The method according to claim 1, which further comprises connecting the at least one input device to the at least one compute and to the at least one machine for processing printing substrates through defined standardized software interfaces.

* * * * *